United States Patent
Lanzinger

(10) Patent No.: US 9,723,031 B2
(45) Date of Patent: Aug. 1, 2017

(54) CONNECTION CONTROL WITH B2BUA LOCATED BEHIND NAT GATEWAY

(75) Inventor: Karl Lanzinger, Munich (DE)

(73) Assignee: Nokia Solutions and Networks Oy, Espoo (FI)

(*) Notice: Subject to any disclaimer, the term of this patent is extended or adjusted under 35 U.S.C. 154(b) by 475 days.

(21) Appl. No.: 13/879,077

(22) PCT Filed: Oct. 15, 2010

(86) PCT No.: PCT/EP2010/065542
§ 371 (c)(1),
(2), (4) Date: Apr. 12, 2013

(87) PCT Pub. No.: WO2012/048753
PCT Pub. Date: Apr. 19, 2012

(65) Prior Publication Data
US 2013/0223437 A1    Aug. 29, 2013

(51) Int. Cl.
*H04L 12/28*    (2006.01)
*H04L 29/06*    (2006.01)
*H04L 29/12*    (2006.01)

(52) U.S. Cl.
CPC ........ *H04L 65/1069* (2013.01); *H04L 29/125* (2013.01); *H04L 61/2564* (2013.01);
(Continued)

(58) Field of Classification Search
None
See application file for complete search history.

(56) References Cited

U.S. PATENT DOCUMENTS

2007/0043876 A1* 2/2007 Varga ............... H04L 29/06027
709/245
2007/0195805 A1* 8/2007 Lindgren ............ H04L 65/1016
370/401
(Continued)

FOREIGN PATENT DOCUMENTS

CN    101496352 A    7/2009
CN    101588615 A    11/2009

OTHER PUBLICATIONS

ETSI TS 183 017 V3.2.1 (Feb. 2010); "Telecommunications and Internet converged Services and Protocols for Advanced Networking (TISPAN); Resorce and Admission Control: Diameter protocol for session based policy setup information exchange between the Application Function (AF) and the Service Policy Decision Function (SPDF); Protocol specification"; 43 pgs.
(Continued)

*Primary Examiner* — Christopher Wyllie
(74) *Attorney, Agent, or Firm* — Harrington & Smith

(57) ABSTRACT

There is proposed a mechanism for a connection control conducted in a communication network (such as IMS) when a back to back user agent (B2BUA) and network address translation function are involved in the establishment of the connection. When a control network element, such as a P-CSCF, receives a signaling message related to the establishment of the communication connection, via a communication leg coming from a network address translation device, it is determined whether address information contained in an SDP element of the signaling message matches with preset address information allocated to a border gateway function or BGF. When no matching is determined, normal processing like an initiation of a latching procedure at an own BGF is conducted. Otherwise, if a matching address information is determined, i.e. a mirrored SDP is deemed to be present, a latching processing at an own BGF (Continued)

is inhibited and the received BGF's address information are used in the connection establishment procedure. This processing is conducted at all session ends coming from the B2BUA, so that a communication connection with media flow can be established through pinholes of the BGF(s).

17 Claims, 11 Drawing Sheets

(52) U.S. Cl.
CPC ........ *H04L 65/1043* (2013.01); *H04L 61/256* (2013.01); *H04L 61/2578* (2013.01)

(56) References Cited

U.S. PATENT DOCUMENTS

| | | | | |
|---|---|---|---|---|
| 2007/0253417 | A1* | 11/2007 | Purnadi | H04L 65/1016 370/392 |
| 2009/0207757 | A1* | 8/2009 | Andreasen | H04L 12/1403 370/254 |
| 2010/0131621 | A1* | 5/2010 | Zetterlund | H04L 29/06027 709/221 |
| 2011/0113145 | A1* | 5/2011 | Panattu | H04L 63/0281 709/228 |
| 2012/0042085 | A1* | 2/2012 | Boeszoermenyi | H04L 63/029 709/228 |

OTHER PUBLICATIONS

ITU-T H.248.37; "Draft revised ITU-T Rec. H.248.37 (2005) 'Gateway control protocol: IP NAPT traversal package' (for Consent)"; Apr. 22-May 2, 2008; 21 pgs.

ETSI TS 183 018 V3.5.2 (Jan. 2010); "Telecommunications and Internet converged Services and Protocols for Advanced Networking (TISPAN); Resource and Admission Control: H.248 Profile Version 3 for controlling Border Gateway Functions (BGF) in the Resource and Admission Control Subsystem (RACS); Protocol specification"; 181 pgs.

ITU-T H.248.40 (Jan. 2007); "Gateway control protocol: Applcation data inactivity detection package"; 16 pgs.

ITU-T H.248.37 (Jun. 2008); "Gateway control protocol: IP NAPT traversal package"; 26 pgs.

Stucker, B. et al; "Analysis of Middlebox Interactions for Signaling Protocol Communication along the Media Pah; draft-ietf-mmusic-media-path-middleboxes-08.txt"; Jul. 8, 2010; 21 pgs.

* cited by examiner

CONNECTION CONTROL WITH B2BUA LOCATED BEHIND NAT GATEWAY

BACKGROUND OF THE INVENTION

Field of the Invention

The present invention relates to a connection control conducted in a communication network. In particular, the present invention relates to a method, apparatus and computer program product providing a mechanism for connecting two parties in a communication network environment (such as IMS) when a back to back user agent (providing functions like call forwarding etc.) and network address translation function are involved in the establishment of the connection.

Related Background Art

Prior art which is related to this technical field can e.g. be found by the technical specification 3GPP ETSI TS 183 017 (current version: 3.2.1) and ITU-T specification H.248.37.

The following meanings for the abbreviations used in this specification apply:

3GPP—3rd generation partnership project
B2BUA—back-to-back user agent
BGF—border gateway function
Call Fwd—call forward
IP—Internet protocol
IMS—IP multimedia subsystem
LAN—local area network
LI—lawful intercept
NAT—network address translation
NAPT—network address port translation
P-CSCF—proxy call state control function
PBX—private branch exchange
PDF—policy decision function
SBC—session border controller
SDP—session description protocol
SIP—session initiation protocol
SPDF—service policy decision function
UE—user equipment
VoIP—voice over IP In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between network elements such as a UE and another communication equipment, such as a database, a server, etc., one or more intermediate network elements, such as network control nodes, support nodes, service nodes and interworking elements are involved which may belong to different communication networks.

A current technology to merge the Internet with the cellular telecommunication world is the Internet Protocol (IP) Multimedia Subsystem IMS. IMS is a standardized architecture for operators intending to provide mobile and fixed multimedia services. IMS uses a Voice over IP (VoIP) implementation based on a 3GPP standardized implementation of Session Initiation Protocol (SIP) and runs over the standard Internet Protocol (IP). Both PS and CS communication systems are supported.

As a signaling mechanisms used in connections or sessions between the IMS network elements and an user equipment or the like, SIP is used as a signaling protocol, while SDP is used for session description. Details of the structure and procedures executed in IMS are described in the related standards and are commonly known to a person skilled in the art so that a further description thereof is omitted herein for the sake of simplicity.

An entry point to an IMS system for a subscriber UE is, for example, a P-CSCF. The P-CSCF functional entity may act as the controller of a Session Border Controller (SBC). The SBC is for example an entity or device used in VoIP networks to exert control over the signaling and also over the media streams.

An example of a logical architecture of an SBC 1 is shown in FIG. 10. The SBC 1 may consist of a border control function 2 and a border gateway function (BGF) 3. The border control function may consist of two elements or entities, i.e. the P-CSCF 4 acting as a controller and a SPDF 5 acting as a policy decision function. The P-CSCF 4 and the SPDF 5 are connected by a specified interface, for example a so-called Gq' interface based on a Diameter protocol, and the SPDF 5 and the BGF 3 may be connected by another interface, for example a so-called Ia interface based on H.248 protocol.

For routing media streams, the BGF may be used as an IP-IP gateway under the control of the P-CSCF 4 and the SPDF 5.

One of the features of the SBC 1 is the media traversal through private NAT or NAPT routers via a so called "latching" procedure. Latching represents a standardized procedure known to those skilled in the art which is executed via the Gq'/H.248 interface, wherein a respective H.248 package is used for the direct control of the BGF 3. The principle idea of the latching procedure is that when a session to or from an end point of a communication, for example an UE, located behind a NAT or NAPT device is setup, the BGF 3 does not yet know address information like the IP address and port on the NAPT router where the media stream will be established. Therefore the BGF 3 waits for the first media packet coming from the NAPT device and then sends its media stream to the IP address and port where the media came from, assuming a symmetrical setup of the media streams (i.e. sending port equals receiving port).

In an IP based communication network, such as the SIP based IMS, functionalities like a so-called back-to-back user agent (B2BUA) may be provided. The B2BUA is a logical network element in SIP applications and operates between both end points of a phone call or communication session. The B2BUA can divide the communication channel into two call legs, i.e. it terminates one call leg and originates a second call leg. In the originating call leg the B2BUA acts as a user agent server (UAS) and processes the request as a user agent client (UAC) to the destination end. As control messages for each call flow through the B2BUA, a service provider may implement value-added features available during the call, for example call forwarding, call transfer etc. In other words, a B2BUA may provide various call processing functions.

The B2BUA may controls features like call forwarding by mirroring a received SDP, i.e. a session description element received in the incoming session is re-used or mirrored in the outgoing session.

However, there may be situations where such a processing does not lead to the desired result. For example, a corresponding processing using the mirroring of the received SDP for call forwarding or the like does not work if the B2BUA is located behind a NAT or NAPT device as discussed above. The reason is that the SDP in the session outgoing from the B2BUA is not the original SDP coming from the session initiator. Since the destination of the call or session coming from the session initiator is known to be behind the NAT or NAPT device, the latching procedure is conducted, i.e. the SDP received at the B2BUA (and thus sent via the second session outgoing from the B2BUA) belongs to a BGF that tries to enable media flow through the NAT or NAPT device by the latching procedure. For example, a situation is assumed where a B2BUA is located behind a NAT or NAPT device. For features like call forwarding the B2BUA is set to connect two parties without staying in the media path. In order to connect the two parties, the B2BUA mirrors the received session description element (SDP) of the first session (from the call originator to the B2BUA) in the second session (from the B2BUA to the (new) destination to which the call forwarding process is directed) and vice versa. As a result of the latching and the NAPT traversal, the BGF in the first session waits for media packets before sending media packets itself. On the other hand, because of latching and NAPT traversal, the BGF in the second session waits for media packets before sending media packets itself. This results in a deadlock situation. However, the B2BUA is not aware of this deadlock situation. It has already left the media path and it will never send any media packet.

SUMMARY OF THE INVENTION

It is an object of the invention to provide an apparatus, method and computer program product by means of which an improved connection control conducted in a communication network can be conducted, in particular in a communication network environment (such as IMS) when a call processing element providing functions like call forwarding etc., such as a back to back user agent, and a network address translation function are involved in the establishment of the connection. Specifically, it is an object of the present invention to provide a connection control mechanism by means of which the problem occurring in a connection establishment with latching and a SIP "back-to-back user agent" B2BUA located behind a NAT or NAPT router is overcome.

These objects are achieved by the measures defined in the attached claims.

According to an example of the proposed solution, there is provided, for example, an apparatus comprising a receiver configured to receive a signaling message related to an establishment of a communication connection, the signaling message is received from a network address translation device, a determiner configured to determine whether address information contained in a session description element of the signaling message matches with preset address information allocated to a border gateway function, and a processor configured to, when the determiner does not determine a matching address information, initiate a latching procedure at an own border gateway function and to set as an address information to be used in the connection establishment an address of the network address translation device, or, when the determiner determines a matching address information, inhibit a latching processing at an own border gateway function and to set as an address information to be used in the connection establishment the address information of border gateway function received in the session description element.

Furthermore, according to an example of the proposed solution, there is provided, for example, a method comprising receiving a signaling message related to an establishment of a communication connection, the signaling message is received from a network address translation device, determining whether address information contained in a session description element of the signaling message matches with preset address information allocated to a border gateway function, and conducting, when a matching address information is not determined, an initiation of a latching procedure at an own border gateway function and a setting as an address information to be used in the connection establishment an address of the network address translation device, or conducting, when a matching address information is determined, an inhibition of a latching processing at an own border gateway function and a setting as an address information to be used in the connection establishment the address information of border gateway function received in the session description element.

According to further refinements, there may be comprised one or more of the following features:
  a signaling message related to the establishment of the communication connection including the address information set by the processor may be sent to an end point of a session of the communication connection;
  the session description element may further comprise port information related to the border gateway function, wherein the port information of the border gateway function may be indicated together with the setting of the address information of the border gateway function;
  as the signaling message related to an establishment of the communication connection, one of a signaling related to a session description protocol offer and a session description protocol answer may be received;
  a reply signaling message related to the establishment of the communication connection may be received, wherein then address information contained in a session description element of the reply signaling message may be replaced with address and port information of an own border gateway function, and a reply signaling message related to the establishment of the communication connection including the address information set by the processor in the replacement may be sent to an end terminal of a session of the communication connection;
  when conducting inhibiting of the latching processing, sending of a latching indication towards the own border gateway function may be inhibited, or a latching indication previously sent to the own border gateway function may be reset and the address information of the border gateway function received in the session description element may be sent to the own border gateway function as an indication of a new partner address;
  the border gateway function whose address information is contained in the received session description element may be the same as the own border gateway function or different to the own gateway function;

the mechanism may be implemented in a softswitch or network control element of a communication network, in particular in a proxy call state control function element of an Internet Protocol based network.

Furthermore, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide a connection control mechanism which allows a successful connection establishment in case a call processing element, such as a B2BUA, is located behind a NAT or NAPT router, e.g. in a private network, executes a function like call forwarding, call transfer etc., i.e. which prevents a deadlock situation. In particular, the proposed mechanism is advantageous in that it is not necessary to change or adapt current standardized procedures in any of the involved network elements or functions, in particular not in a control network element like a P-CSCF, since for example no extensions in existing signaling is required.

Therefore, the proposed mechanism is for example applicable in a case where private PBXs (as a B2BUA functionality) which are used in a company in the company's private network are located behind a NAT or NAPT router. The PBXs can handle the feature "call forwarding" to an external destination in the way that they just mirror the received session description SDP as usual, while the connection and in particular the media flow can be established without causing a deadlock situation.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, the examples and embodiments will be described in connection with a communication system which may be based on a TISPAN system. However, it is to be noted that the present invention is not limited to an application in such a system or environment but is also applicable in other communication systems, connection types and the like, for example in a 3GPP based system where a border gateway function is directly attached to the P-CSCF by an Iq interface, or the like.

A basic system architecture of a communication network may comprise a commonly known architecture comprising a wired or wireless access network subsystem and a core network. Such an architecture comprises one or more access network control units, radio access network elements, access service network gateways or base transceiver stations, with which a UE is capable to communicate via one or more channels for transmitting several types of data. Furthermore, core network elements such as gateway network elements, policy and charging control network elements and the like are usually comprised. The general functions and interconnections of these elements are known to those skilled in the art and described in corresponding specifications so that a detailed description thereof is omitted herein. However, it is to be noted that several additional network elements and signaling links may be employed for a communication connection or a call between UEs and/or servers than those described in detail herein below.

Furthermore, the described network elements, such as control network nodes like call state control functions, border gateway functions, B2BUA, UEs and the like, as well as corresponding functions as described herein may be implemented by software, e.g. by a computer program product for a computer, and/or by hardware. In any case, for executing their respective functions, correspondingly used devices and network element may comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1:
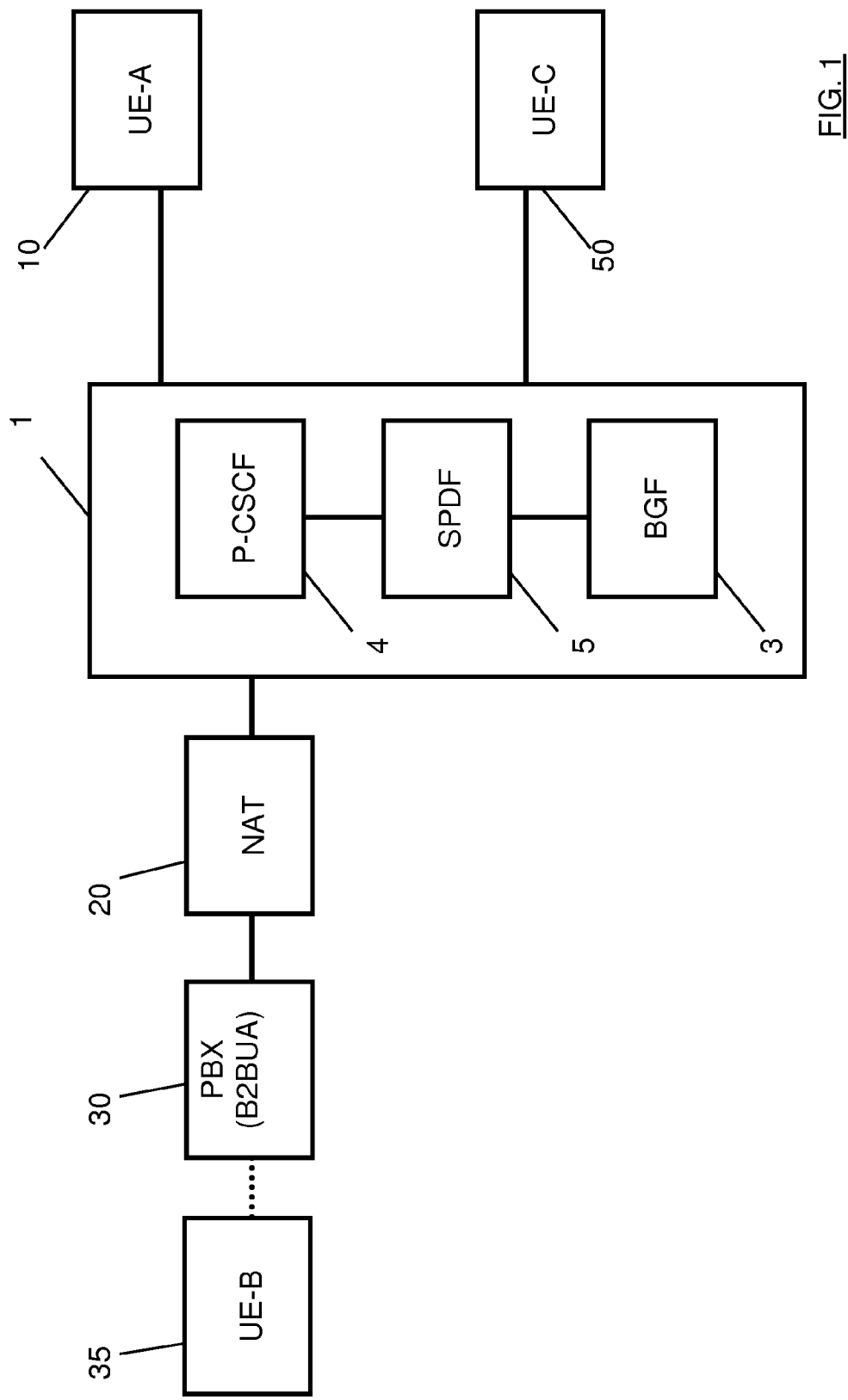
FIG. 1 shows a diagram illustrating a scenario in an architecture of a communication network where examples of embodiments of the present invention are applicable.

In FIG. 1, a simplified architecture of an exemplary communication network is shown for illustrating a scenario where examples of embodiments of the present invention are applicable. Specifically, FIG. 1 shows an IMS based communication network configuration according to TISPAN principles where a NAT (or NAPT) function as well as a user agent function in the form of a B2BUA for providing call processing functions like call forwarding are implemented.

It is to be noted that the network architecture shown in FIG. 1 depicts only those network elements which are useful for understanding the principles of the examples of embodiments of the invention. As known by those skilled in the art there are several other network elements involved in the establishment, control and management of a communication connection which are omitted here for the sake of simplicity.

Figure 10:
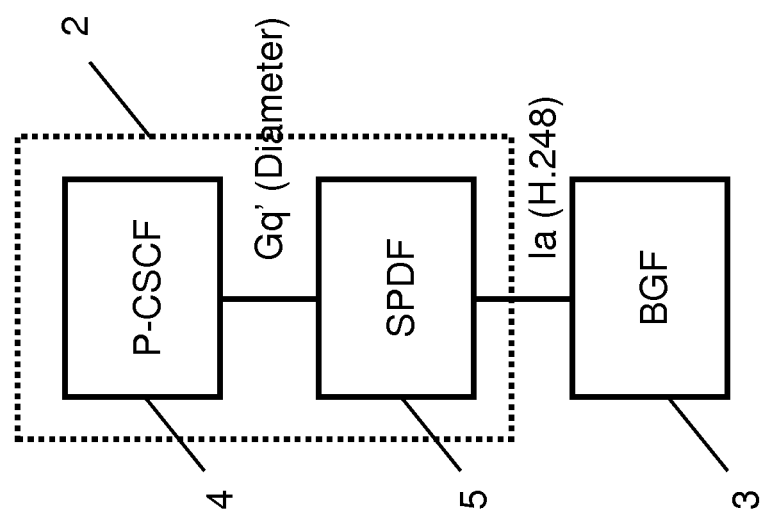
FIG. 10 shows a diagram illustrating a TISPAN logical architecture for PDF Support and SBC Control.

Referring to FIG. 1, reference sign 10 denotes a UE-A which is a terminal device or the like of a subscriber and from which a connection establishment is initialized (i.e. signaling originator). Reference signs 35 and 50 denote other terminal devices or UEs, i.e. a UE-B 35 and a UE-C 50, which are used in the depicted scenario as possible end points of a communication connection, i.e. as possible destinations for the communication connection. Reference sign 20 denotes a NAT (or NAPT) router which is used for network address and port translation in the IMS network. Reference sign 30 denotes a PBX acting as a B2BUA for providing call processing functions, for example for the subscriber of UE-B 35. Reference sign 1 denotes an SBC as discussed, for example, in connection with FIG. 10.

In the scenario as illustrated in the diagram according to FIG. 1, it is assumed that the UE-A 10 tries to initiate a communication connection with the UE-B 35. However, the PBX 30 located behind the NAT router 20 intercepts the setup to the UE-B 35 and performs, for example, a preset call forwarding to another UE of the respective subscriber, e.g. to the UE-C 50.

In view of the structure of the communication network as shown in FIG. 1, i.e. due to the fact that the PBX 30 is located behind the NAT device 20 from the viewpoint of the connection control element located in the SBC 1 (i.e. the P-CSCF 4), as described above, according to a conventional call control, a deadlock situation would be the result.

Figure 2:
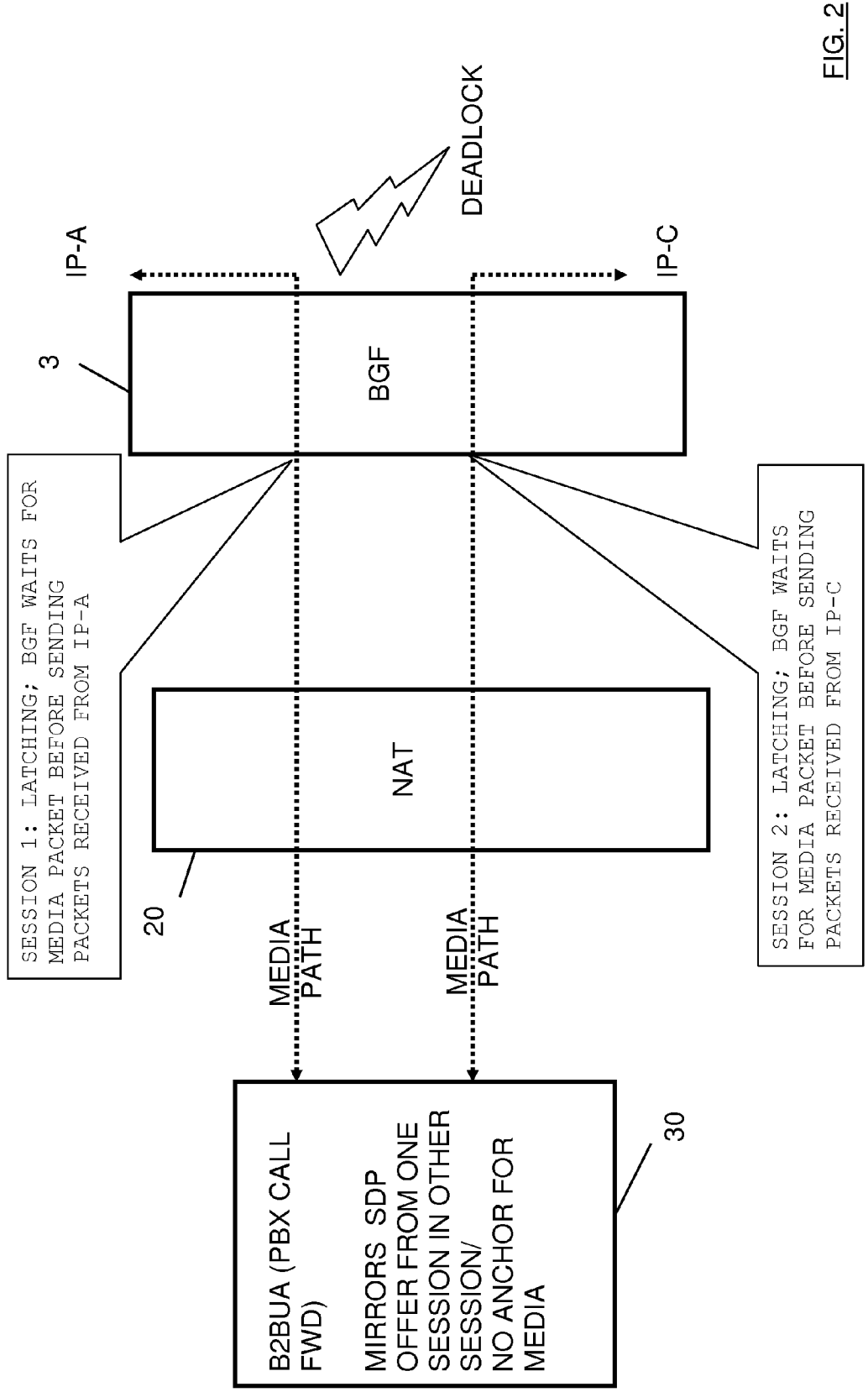
FIG. 2 shows a diagram illustrating a deadlock situation which may occur in a communication network working according to a conventional connection control mechanism.
Figure 11:
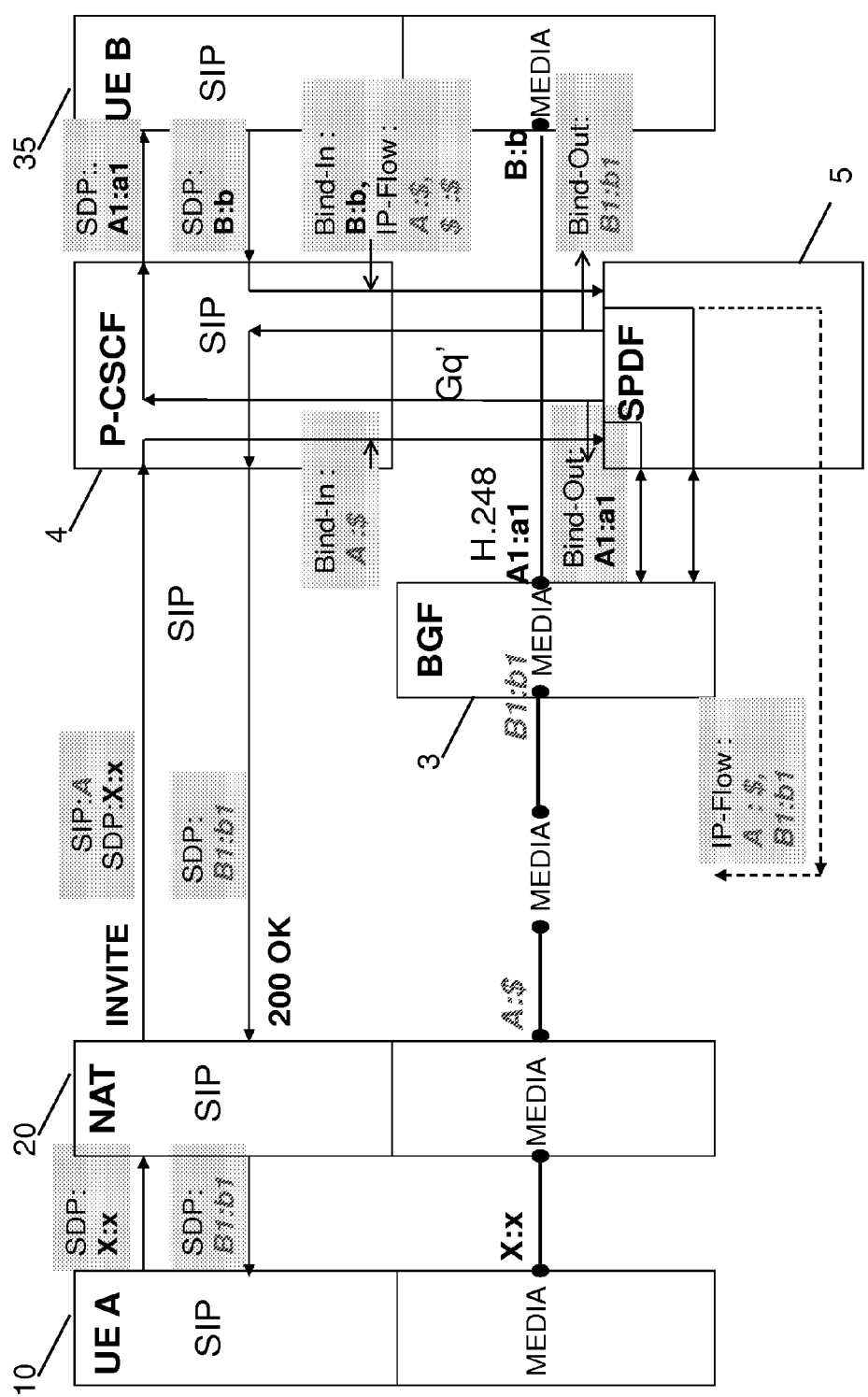
FIG. 11 shows a diagram illustrating signaling in a communication network for establishing a communication connection with media flow when a latching procedure is conducted

Before explaining the occurrence of the deadlock situation in a communication network scenario as illustrated in FIG. 1 on the basis of FIG. 2, reference is made to the diagram illustrated in FIG. 11. In FIG. 11, it is described how in a TISPAN based communication network where a NAT device 20 is placed in the communication path the signaling flow and address information exchange including a latching procedure is performed.

It is to be noted that the elements illustrated in FIG. 11 are further discriminated, where necessary, into a part related to SIP signaling and a part related to media flow.

Specifically, in FIG. 11, it is assumed that a UE-A 10 as a call initiator sends an call establishment message such as a SIP INVITE message via the NAT device 20 to a destination (here, UE-B 35). The message from the UE-A 10 contains as address information X:x, i.e. an indication of an IP address X and a port x. In the NAT device 20, network address translation is done, and an INVITE message from IP address A of the NAT device 20 and an SDP including the original address and port information X:x is sent towards the IMS control element or softswitch, i.e. the P-CSCF 4 of the SBC 1. The P-CSCG 4, being aware that the INVITE message comes from a Far-end NAT subscriber, starts a latching process by instructing the BGF 3 (via the SPDF 5) to latch for NAPT traversal on the media level. In parallel, it hands over the IP address of the NAT device (A) together with a choose operator indication ($) via the Gq' and H.248 interface (i.e. binding input is A:$). Thus, at the BGF side, address information such as A1:a1 are bound out.

After the binding of the address information as A1:a1 is done, the INVITE message is forwarded via the P-CSCF to the destination, i.e. the UE-B 35.

In reply to the INVITE message, the UE-B 35 sends, for example, a response or 2000K message towards UE-A 10 via the P-CSCF 4 for indicating acceptance of the connection establishment request. The response message from the UE-B 35 comprises in the SDP an indication of B:b, for example.

The P-CSCF 4 forwards the information contained in the SDP of the message coming from UE-B 35 to the SPDF 5 and the BGF 3, i.e. it binds in the B:b information and indicates as an IP flow A:$ and B1:b1. At the SPDF 5, B1:b1 is bound out for the connection towards the UE-B 35.

Then, the response or 2000K message is sent towards the NAT device 20 and the session initiator UE-A 10 with an SDP indicating B1:b1.

Thus, on the media level, a connection between the UE-A 10 and the UE-B 35 is established via the NAT device 20 and the BGF 3 with the respective IP address and port information exchanged as described above.

Now, with regard to FIG. 2, when in the communication network scenario as shown in FIG. 1 the B2BUA 30 performs a call processing including mirroring of a received SDP to the other call leg, such as in case of call forwarding, the session description element received in the first session is re-used or mirrored in the second session, and vice versa. Since the B2BUA 30 is located behind the NAT device 20, the SDP in the session outgoing from the B2BUA is not the original SDP coming from the session initiator, like the UE-A 10. Since the destination of session 1 coming from the UE-A 10 is known in the P-CSCF 4 to be behind the NAT device 20, latching procedure is conducted, as described above, i.e. the SDP received at the B2BUA 30 (and thus sent via the session 2 outgoing from the B2BUA) belongs to the BGF 3 that tries to enable media flow through the NAT device 20 by the latching procedure.

As a result, as depicted in FIG. 2, since the B2BUA 30 tries to connect the two parties UE-A 10 and UE-C 50, for example, without staying in the media path, it only mirrors the respectively received SDP from one session into the other session. Hence, due to latching and NAT traversal, the BGF 3 assumes a media path from UE-A 10 to the B2BUA 30 and waits thus for media packets before sending media packets itself, while the BGF 3 assumes also a media path from the UE-C 50 to the B2BUA 30 in the second session and waits for media packets before sending media packets itself. As the B2BUA 30 has left the media path (since it is no media anchor point in the call processing like call forwarding) and is also not aware of the situation the deadlock situation occurs.

In the following, for avoiding the deadlock situation in a scenario as depicted in FIG. 1, for example, examples of embodiments of the invention are described with reference to FIGS. 3 to 5.

Basically, according to examples of embodiments of the invention, a control entity of the communication network, such as an IMS control element like a P-CSCF or a softswitch, is able to recognize that a call processing entity, such as a user agent like a B2BUA which is located "behind" a NAT or NAPT router, intends to connect two other parties.

According to an example of embodiments of the invention, a session correlation by using address information related to the BGF is conducted. Specifically, according to this example, when a signaling message related to the establishment of a communication connection is received from a side including a NAT (or NAPT) router or device (which is also referred to as far-end NAT side), a detection is made whether this signaling message (such as a SIP INVITE or RESPONSE message) comprises a session description element (SDP) which contains an address information, like an IP address, which is allocated to a BGF. For this purpose, it is necessary that possible IP addresses or the like of BGFs are known/stored at the IMS control element like the P-CSCF or the softswitch. This can be achieved, for example, by preconfiguring the P-CSCF by means of storing respective addresses in a memory or the like, or by conducting an "on the fly" learning of corresponding address information by using answer messages or the like coming from a BGF, or the like.

If the IMS control element or softswitch, such as the P-CSCF, detects BGF's IP address(es) on access side pinholes in the SDP received from a Far-end NAT subscriber then it is concluded that a mirrored SDP is present, i.e. that behind the NAT device a network function or element is present (i.e. a B2BUA) conducting SDP mirroring in the course of a call processing like call forwarding.

According to the present example of embodiments of the invention, in case a mirrored SDP is detected, then for this active SDP Offer/Answer cycle the Far-end NAT condition for the UE in question is disabled. Disabling of the Far End NAT condition means that on the Gq'/H.248 interface a latching indication is not sent out to the SPDF/BGF, and that the binding input on the access side is taken out of the SDP like for normal sessions, instead of using the NAT's public IP address (A in FIG. 11).

In other words, according to the present example of embodiments of the invention, it is recognized that the B2BUA mirrored the SDP so that the two parties are to be connected outside the NAT router.

For illustrating the respective signaling and processings of the present example of embodiments of the invention, in the following description according to FIGS. 3 to 5, a handling of the SDP offer and a handling of the SDP answer is described. It is to be noted that due to the call forwarding function, each offer and each answer is handled in the independent sessions on both sides on the B2BUA. As in the case of FIG. 2, initially (i.e. for the SDP Offer cycle) a session indicated as the first session is outgoing from the P-CSCF 4 to the B2BUA 30 behind the NAT router 20, and a session indicated as the second session is incoming from the B2BUA towards the IMS or softswitch (the P-CSCF 4). Furthermore, in the figures described in the following, a control signaling flow based, for example, on SIP is indicated by solid arrows while a media flow is indicated by dashed arrows.

As indicated above, according to the present example of embodiments of the invention, the correlation is based for example on the IP address received from the NAT side, wherein in case the received IP address matches the stored or learned IP address of the BGF then a mirrored SDP is assumed.

Figure 3:
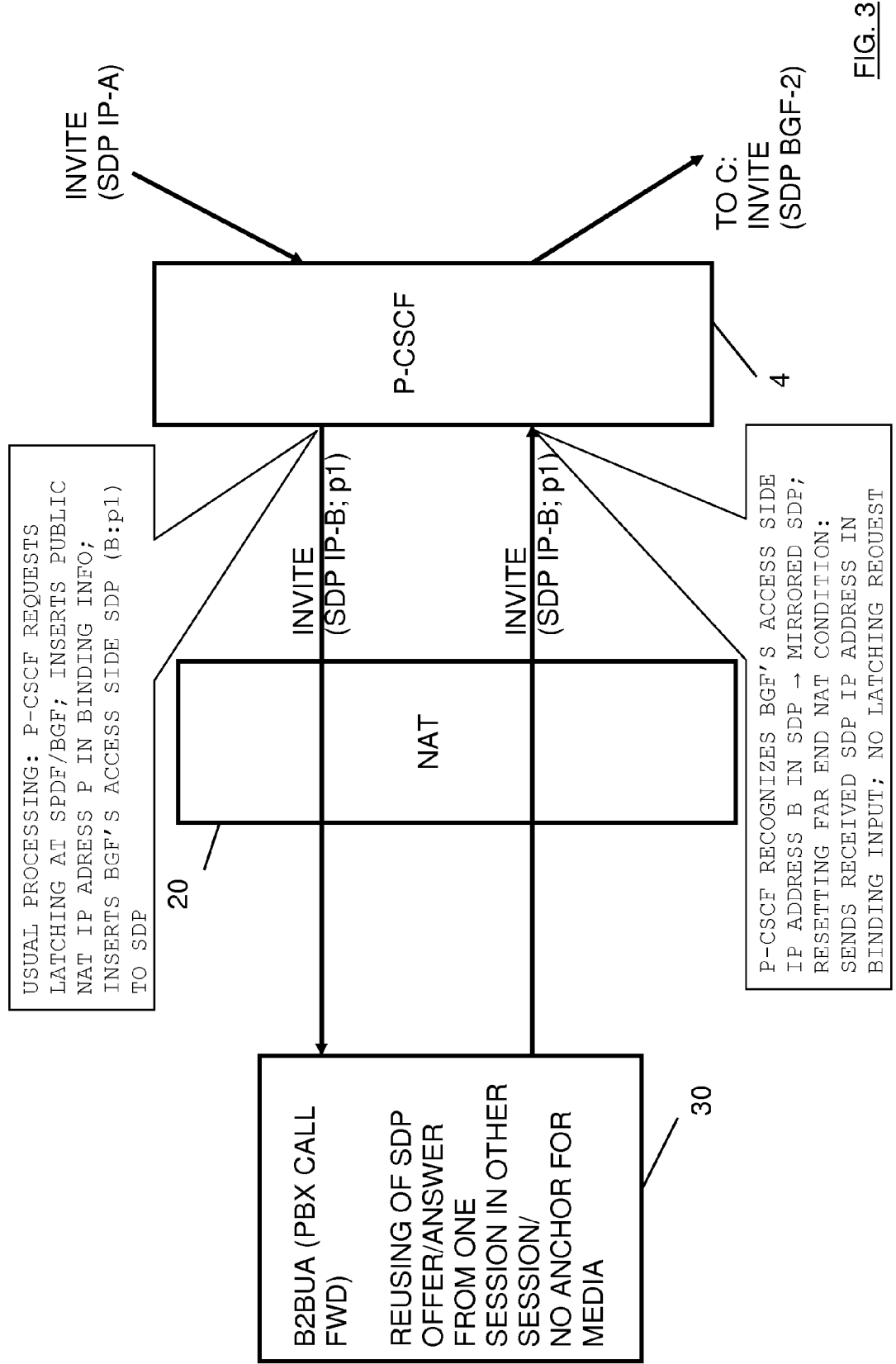
FIG. 3 shows a diagram illustrating a processing for call control at a SDP offer according to an example of embodiments of the present invention.

With regard to FIG. 3, a handling of an SDP Offer signaling in the P-CSCF 4, the NAT router 20 and the B2BUA 30 in a network configuration corresponding to FIG. 1 is shown.

With regard to the first session (i.e. upper arrow in FIG. 3, session outgoing to the NAT router 20), the P-CSCF 4 conducts, after receiving a session initiation message such as a SIP INVITE message from UE-A 10 (including the IP address of the UE-A), a normal NAT (or NAPT) traversal session handling. Specifically, for example, the P-CSCF (or other softswitch) on the terminating side of the session knows that the destination is located behind the NAT router 20. Therefore, it inserts the public IP address of the NAT device 20 in the binding information and replaces the IP address and port information of the received SDP with the BGF's pinhole addresses and ports in the SDP. Furthermore, the P-CSCF 4 as the session border control element requests or instructs a latching processing, i.e. it instructs the BGF (e.g. via the SPDF 5 by means of the Gq'/H.248 interfaces) to latch for NAT traversal on media level. Then the communication connection initiation message, i.e. the SIP INVITE message, is sent out to the destination behind the NAT device 20 including the SDP with the BGF's address and port information.

The B2BUA 30, which is for example implemented in a PBX, which is located behind the NAT router 20 and conducts call processing on behalf of the called subscriber, such as call forwarding, conducts the usual processing. That is, it is the end point of the first session and establishes a second session towards the alternative destination set in the call forwarding processing, e.g. UE-C 50 in FIG. 1. Hence, it establishes a second separate session (the lower arrow in FIG. 3) via the NAT router 20, wherein it mirrors or reuses the SDP received in the first session in the connection establishment message (e.g. SIP INVITE message) sent via the second session. However, as indicated above, the B2BUA 30, due to the call forwarding function (or another similar call processing function like call transfer etc.) does not intend to be a media anchor in the connection to be established.

When, in this second session, the IMS or softswitch, e.g. again the P-CSCF 4, receives an incoming session initiation message or SIP INVITE message from a Far-end NAT terminal (i.e. a session end point located behind the NAT router 20), it determines whether in the session description element or SDP of the received signaling (i.e. SIP INVITE message) from the NAT side address information, such as IP address(es) are present which match to at least one of pre-stored or learned IP addresses of a BGF.

If the determination of the IP address contained in the SDP results in that the IP address does not match with one of the stored or learned BGF's IP addresses, the IMS or softswitch, i.e. the P-CSCF 4 performs a default processing in this case, i.e. in a case when a signaling message for connection establishment is received from a Far-end NAT side. Specifically, the P-CSCF 4 instructs the BGF via Gq'/H.248 interfaces to latch for NAT traversal on the media level and hands over the public IP address of the NAT router 20.

However, according to the present example of embodiments of the invention, in case the determination of the IP address contained in the received SDP of the second session's signaling results in that the IP address matches with at least one of the stored or learned BGF's IP addresses, then the IMS or softswitch (i.e. the P-CSCF 4 in FIG. 1) assumes a mirrored SDP and inhibits a latching process. That is, the P-CSCF 4 does not instruct the BGF to latch for NAPT traversal on media level, i.e. it prohibits the sending of a corresponding indication to the BGF. Furthermore, the P-CSCF 4 hands over the IP address received in the SDP of the incoming signaling message, i.e. it hands over or uses the BGF's IP address instead of the public IP address of the NAT router 20. In other words, the P-CSCF 4 resets a Far-end NAT condition for the current session even though the signaling is received from a NAT side.

As a result, the IMS or softswitch, i.e. the P-CSCF 4 in FIG. 3, on the originating side of a NAT or NAPT traversal session replaces the IP address and port information in the received SDP coming from the NAT side (i.e. from the NAT router 20) with the BGF's pinhole addresses and ports. Thereafter, a corresponding signaling message for connection establishment, i.e. a SIP INVITE message, is send towards a destination point, for example the UE-C 50, wherein this message contains a session description element (SDP) containing the BGF's address information (IP address and port information).

Figure 4:
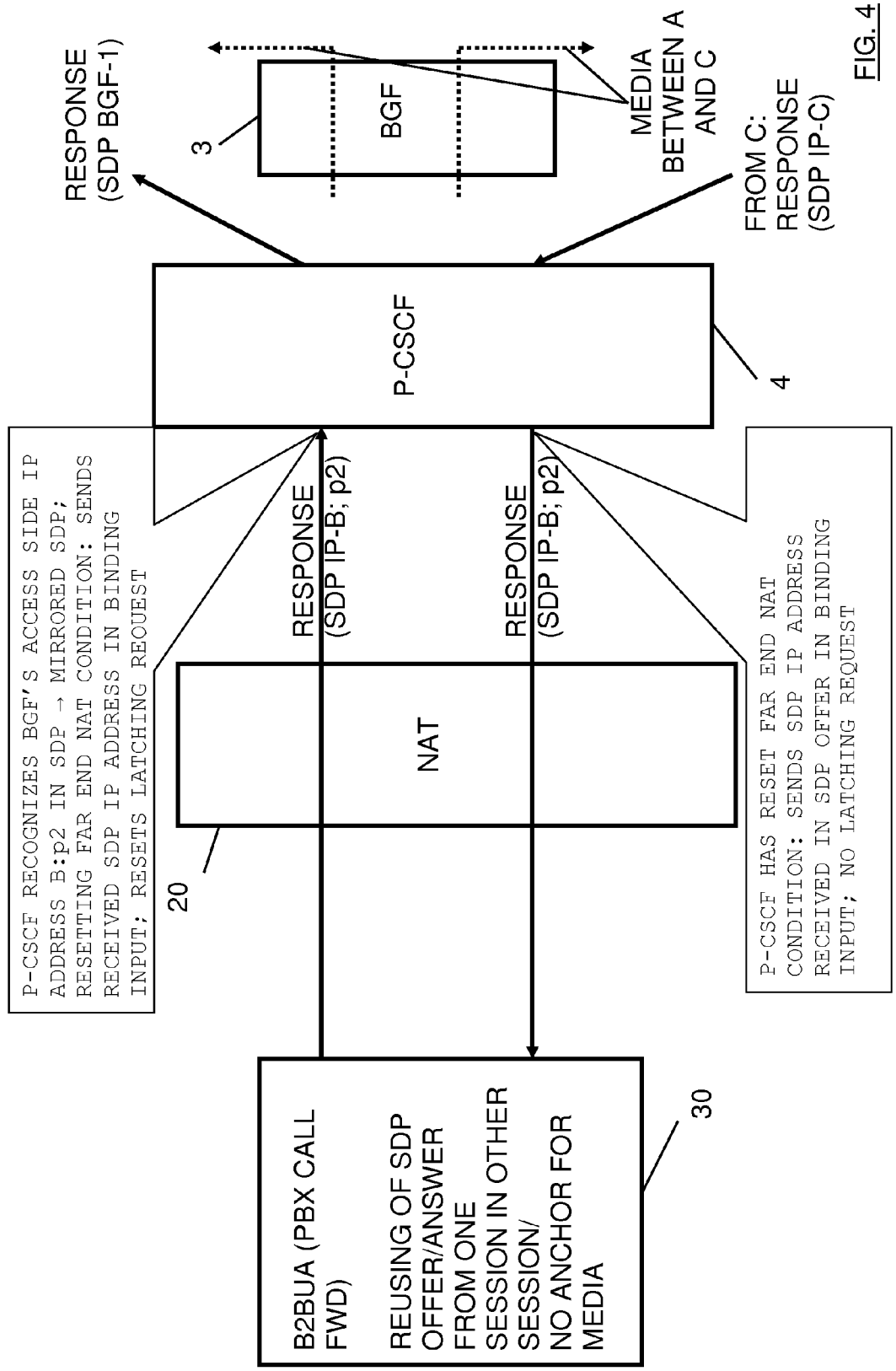
FIG. 4 shows a diagram illustrating a processing for call control at a SDP answer according to an example of embodiments of the present invention.

Next, with reference to FIG. 4, a handling of an SDP Answer signaling, following the SDP Offer signaling of FIG. 3, in the P-CSCF 4, the NAT router 20 and the B2BUA 30 in a network configuration corresponding to FIG. 1 is shown.

With regard to the second session, when the P-CSCF 4 receives a responding signaling message, such as a SIP RESPONSE message from the destination point (i.e. from UE-C 50), it conducts a normal session handling. Specifically, since the P-CSCF as the IMS or softswitch on the originating side of a NAT or NAPT traversal session has reset the Far-end NAT condition for this session, it replaces the IP address and port information in the received SDP answer with the BGF's pinhole addresses and ports. A signaling message (e.g. SIP RESPONSE message) comprising corresponding SDP information is then sent to an end point of the session, i.e. the B2BUA 30.

The B2BUA 30 which is located behind the NAT router 20 and conducts call processing on behalf of the called subscriber again conducts the usual processing. That is, as it is the end point of the first session and the second session, it reuses or mirrors the received SDP of the signaling message in the second session in the signaling via the first session through the NAT router 20 (e.g. in a corresponding SIP RESPONSE message).

When, in this first session, the IMS or softswitch, e.g. again the P-CSCF 4, receives the response message to the original INVITE message, it conducts a normal session handling. That is, the P-CSCF 4 as the IMS or softswitch on the terminating side of a NAPT traversal session replaces the IP address and port information in the received SDP with the BGF's pinhole addresses and ports. In addition, according to the present example of embodiments of the invention, the P-CSCF 4 as the IMS or softswitch checks or determines whether in the received SDP (incoming via the first session) from the NAT side the contained IP address(es) matches with pre-stored or learned IP addresses of the BGF. Then, if a matching is determined, the P-CSCF 4 resets the Far-end NAT condition. That is, for inhibiting the latching processing, a latching indication towards the own BGF is reset. Furthermore, as new partner IP address, the P-CSCF 4 uses as a binding input the IP address of the BGF received in the SDP coming from the NAT side.

Figure 5:
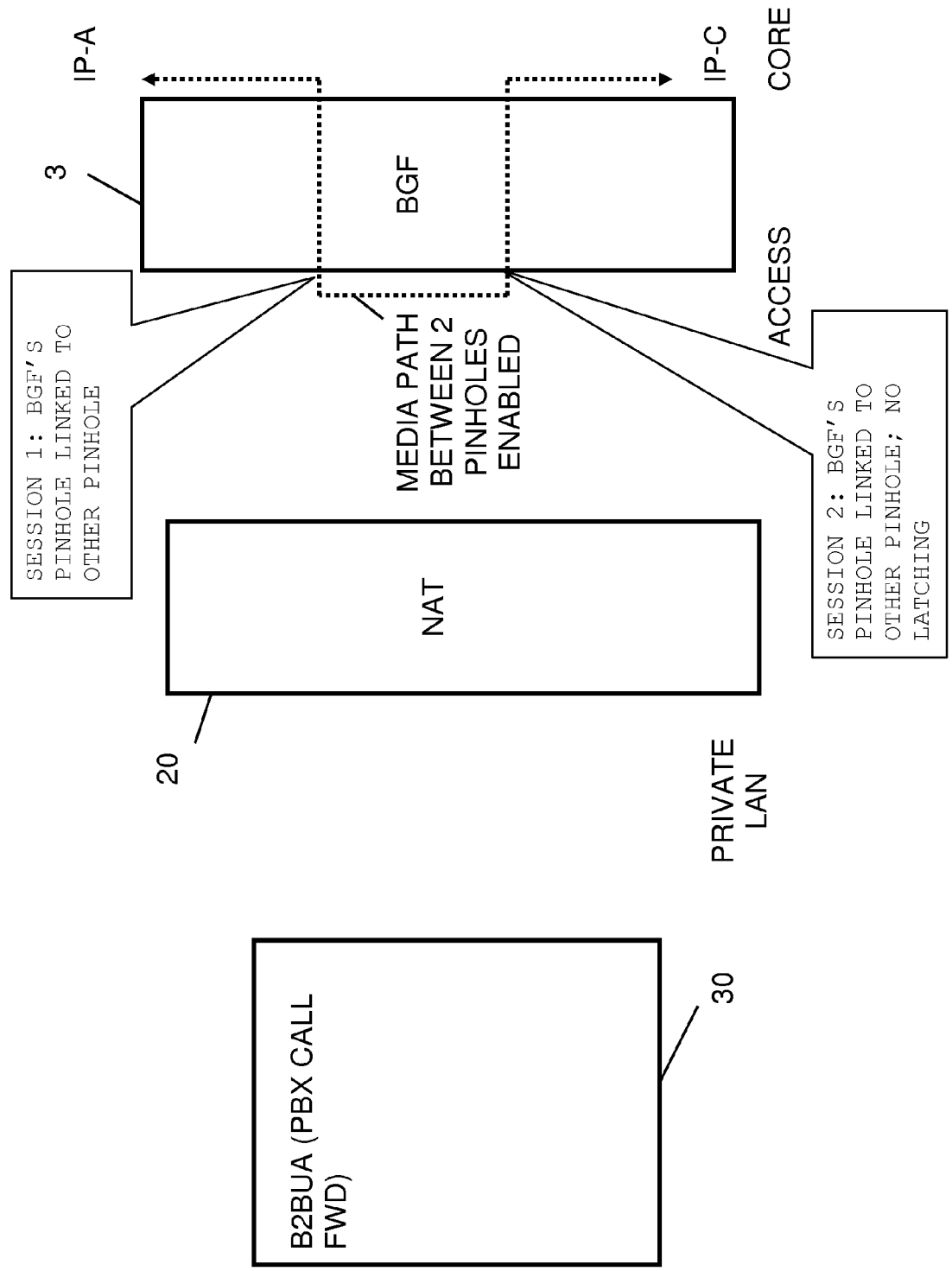
FIG. 5 shows a diagram illustrating a situation after processing for call control according to an example of embodiments of the present invention.

As a result of the above described processing, as indicated in FIGS. 4 and 5, a media path or flow can be established between the respective end points of the connection, such as the UE-A 10 and the UE-C 50, via the BGF 3 by linking pinholes with each other. Specifically, as a final situation achieved after the SDP Offer-Answer Cycle shown in FIGS. 3 and 4, the following is achieved. Two pinholes are allocated in the BGFs (in this connection, it is to be noted that the BGFs described above may be one and the same BGF or different (i.e. separated BGFs) via which the media path is established (see e.g. FIG. 5). Furthermore, on the access side, the pinholes are linked to each other, i.e. in H.248 words the remote address of pinhole 1 (upper pinhole in FIG. 5 related to session 1) is the local address of pinhole 2 (lower pinhole in FIG. 5 related to session 2) and vice versa. The $1^{st}$ pinhole has got a latching indication that was removed with a second Gq/H.248 request, while on the other hand the second pinhole never has got a latching indication. Thus, a media flow between the call parties (UE-A 10 and UE-C 50) through the two pinholes of the BGF 3 can be established while a deadlock situation is avoided.

Figure 6:
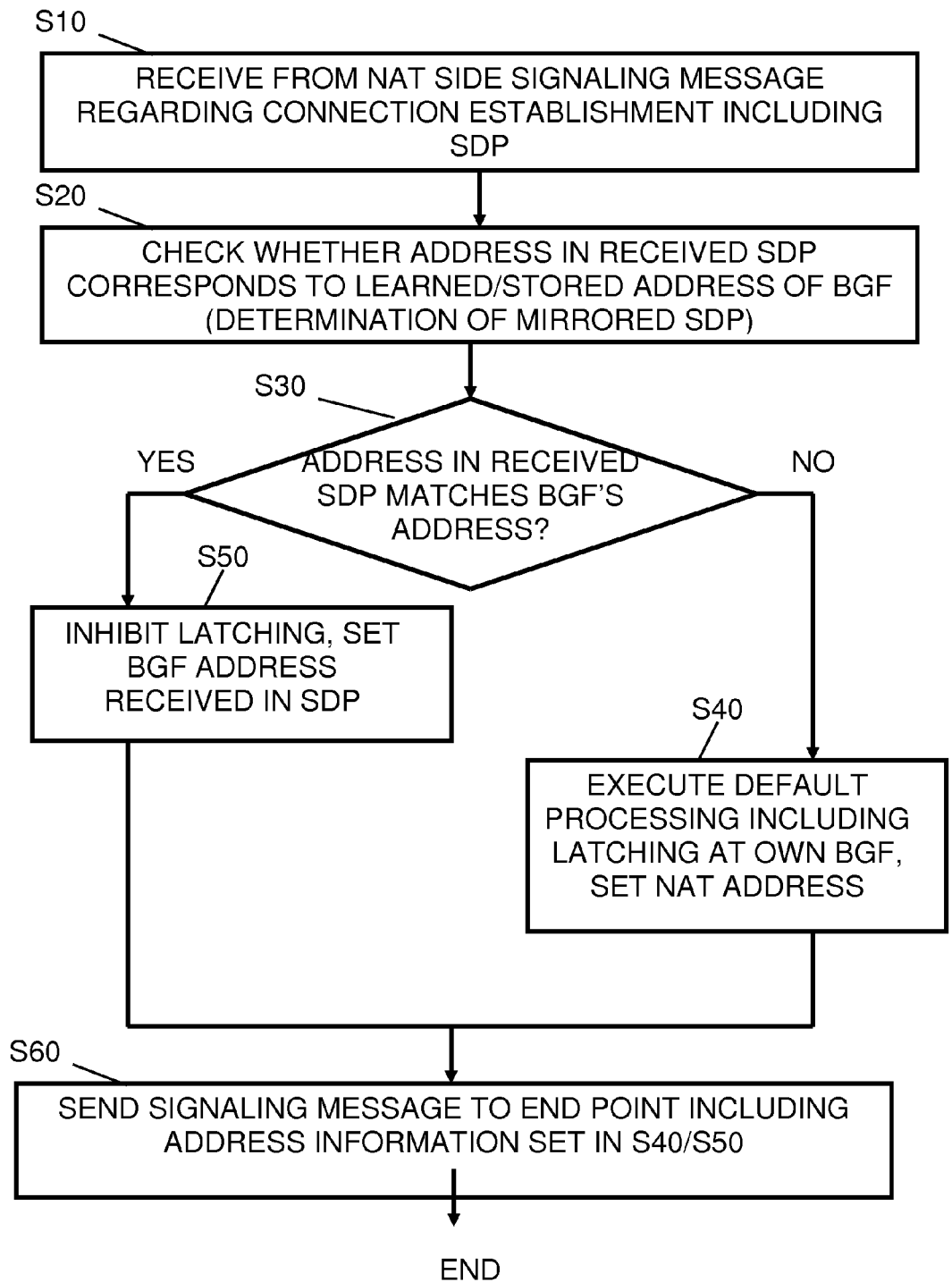
FIG. 6 shows a flowchart illustrating a control procedure executed in a control network element such as a P-CSCF according to examples of embodiments of the invention.

FIG. 6 shows a flowchart illustrating a control procedure executed in a control network element such as the P-CSCF 4 according to examples of embodiments of the invention. The control processing according to FIG. 6 corresponds to the control conducted in the P-CSCF 4 according to FIGS. 3 and 4, for example.

First, in a step S10, a signaling message related to an establishment of a communication connection, such as a SIP INVITED message is received via a communication leg coming from a NAT device, e.g. the NAT router 20 (signaling corresponding to session 2 in FIG. 3 or session 1 in FIG. 4).

In step S20, it is determined whether address information, such as an IP address, contained in a SDP element of the signaling message matches with preset (i.e. stored or learned) address information allocated to a BGF.

In step S30, it is decided whether the determination in step S20 is positive or negative. If the decision in step S30 is Yes (i.e. a matching IP address is present, resulting in the assumption of a mirrored SDP), the process advances to step S50. Otherwise, if the decision in step S30 is No (i.e. no matching IP address is present), the process advances to step S40.

In step S40, a usual processing or default processing is conducted, i.e. latching at the own BGF is instructed or initiated and the public IP address of the NAT device is used for binding (i.e. set for further call establishment proceeding).

On the other hand, in step S50, i.e. when a matching address information is determined, latching processing at an own BGF is inhibited (e.g. by not sending a latching indication or by resetting a latching indication sent beforehand), and the address information of the BGF received in the SDP is used for binding.

Then, in step S60, a signaling message (SIP signaling) comprising a SDP with the set address information is sent to an end point of a session of the communication connection to be established.

Figure 7:
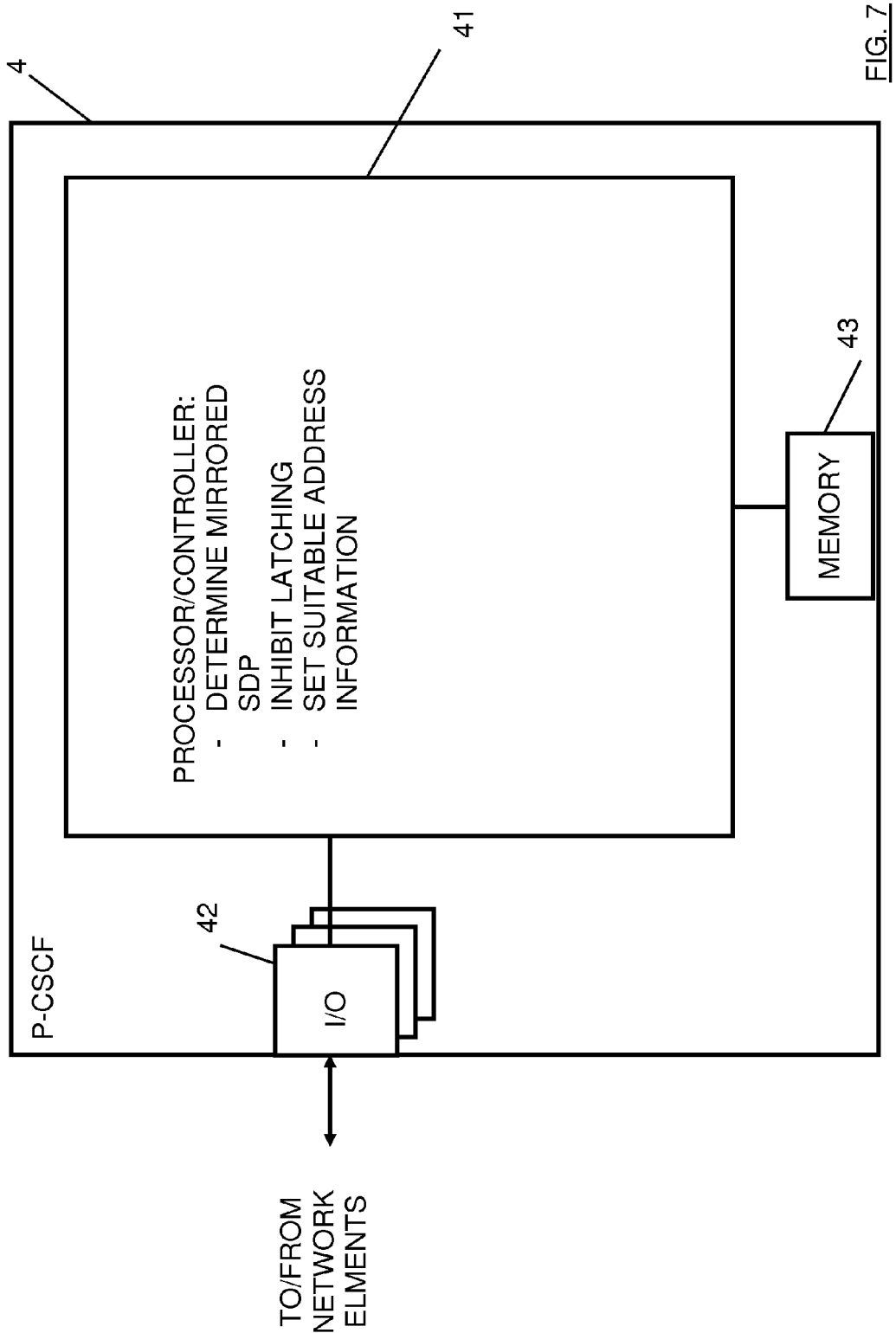
FIG. 7 shows a block circuit diagram illustrating a configuration of a control network element such as a P-CSCF according to examples of embodiments of the invention.

FIG. 7 shows a block circuit diagram illustrating a configuration of a control network element, such as the P-CSCF 4, which is configured to implement the processing as described in connection with FIG. 6. It is to be noted that the control network element or P-CSCF 4 shown in FIG. 6 may comprise several further elements or functions besides those described in connection therewith but which are omitted herein for the sake of simplicity as they are not essential for understanding the invention.

The P-CSCF 4 may comprise a processing function or processor 41, such as a CPU or the like, which executes instructions given by programs or the like related to the power control. The processor 41 may comprise further portions dedicated to specific processings as described below. Portions for executing such specific processings may be also provided as discrete elements or within one or more further processors, for example. Reference signs 42 denote transceiver or input/output (I/O) units connected to the processor 41. The I/O units 42 may be used for communicating with other network elements or functions, such as the SPDF 5 (and thus the BGF 3) according to FIG. 1, or the communication end points (i.e. UEs, B2BUA 30 or NAT device 20) controlled by the P-CSCF 4. The I/O units 42 may be a combined unit comprising communication equipment towards several of the network elements in question, or may comprise a distributed structure with a plurality of different interfaces for each network elements in question. Reference sign 43 denotes a memory usable, for example, for storing data and programs to be executed by the processor 41 and/or as a working storage of the processor 41. In particular, IP address references of BGF(s) may be stored here.

The processor 41 is configured to execute processings related to the connection control described above. In particular, the processor 41 is usable for determining a mirrored SDP, e.g. by determining whether a matching IP address is present in a received SDP, for inhibiting a latching procedure at the own BGF, and for setting suitable address information (IP address and port information) in the messages sent towards end points of the communication connection so as to establish a situation as described, for example, in connection with FIG. 5.

In the following, a further example of an alternative solution of a call control for avoiding the deadlock situation (as discussed in connection with FIG. 2) in a communication network example as depicted in FIG. 1 is described with reference to FIGS. 8 and 9.

This alternative solution is related to a session correlation by means of an additional information element contained in a session description element, for example an additional SDP signaling element. In other words, according to the further example of an alternative solution, a new information element is included in the SDP. For example, the IMS control element or softswitch, such as the P-CSCF 4, is adapted to include SDP data that was signalled before the NAT or NAPT traversal procedure in SDP data sent to the NAT router 20.

It is to be noted that in the description of the alternative solution, for illustrating the respective signaling and processings, a handling of the SDP offer and a handling of the SDP answer is described. It is to be noted that due to the call forwarding function or the like, each offer and each answer is handled in the independent sessions on both sides on the B2BUA. As in the case of FIG. 2, initially (i.e. for the SDP Offer cycle) a session indicated as the first session is outgoing from the P-CSCF 4 to the B2BUA 30 behind the NAT router 20, and a session indicated as the second session is incoming from the B2BUA towards the IMS or softswitch (the P-CSCF 4). Furthermore, in the figures described in the following, a control signaling flow based, for example, on SIP is indicated by solid arrows while a media flow is indicated by dashed arrows.

Basically, according to the further example of an alternative solution of a call control, in an originating session, the P-CSCF 4 as the IMS or softswitch signals the first received session description in a hidden information element to the B2BUA 30 which is located behind the NAT router 20. Additionally, the P-CSCF 4 sends a checksum over the sent SDP IP addresses. This checksum is used in the later procedure to identify a mirrored SDP.

For example, the information element that is used to transport the received IP addresses, ports and the checksum over the sent IP addresses and port my be a new type of SDP a=line introduced at an SDP session layer.

On the other hand, the IMS or softswitch on the terminating session, e.g. the P-CSCF 4, identifies via the hidden signaling information and by verifying the checksum that the B2BUA 30 behind the NAT device 20 has conducted mirroring of the SDP data (e.g. due to a call forwarding procedure) and that hence the B2BUA 30 intends to connect two parties outside the NAT LAN. Thus the IMS or softswitch on the terminating side forwards the received SDP read out of the hidden signaling information to the destination of the second session. The answer from the terminating side is treated the same way vice versa.

As a result of this further example of an alternative solution, a media connection between the two parties, such as UE-A 10 and UE-C 50 in FIG. 1, is established in the way the B2BUA intended but without a deadlock.

It is to be noted that according to this further example of an alternative solution the IMS systems or softswitches handling the two sessions are not necessarily to be identical or to exchange any information about the sessions. The exchange of information (i.e. of the hidden additional information element) happens on the signaling level.

Figure 8:
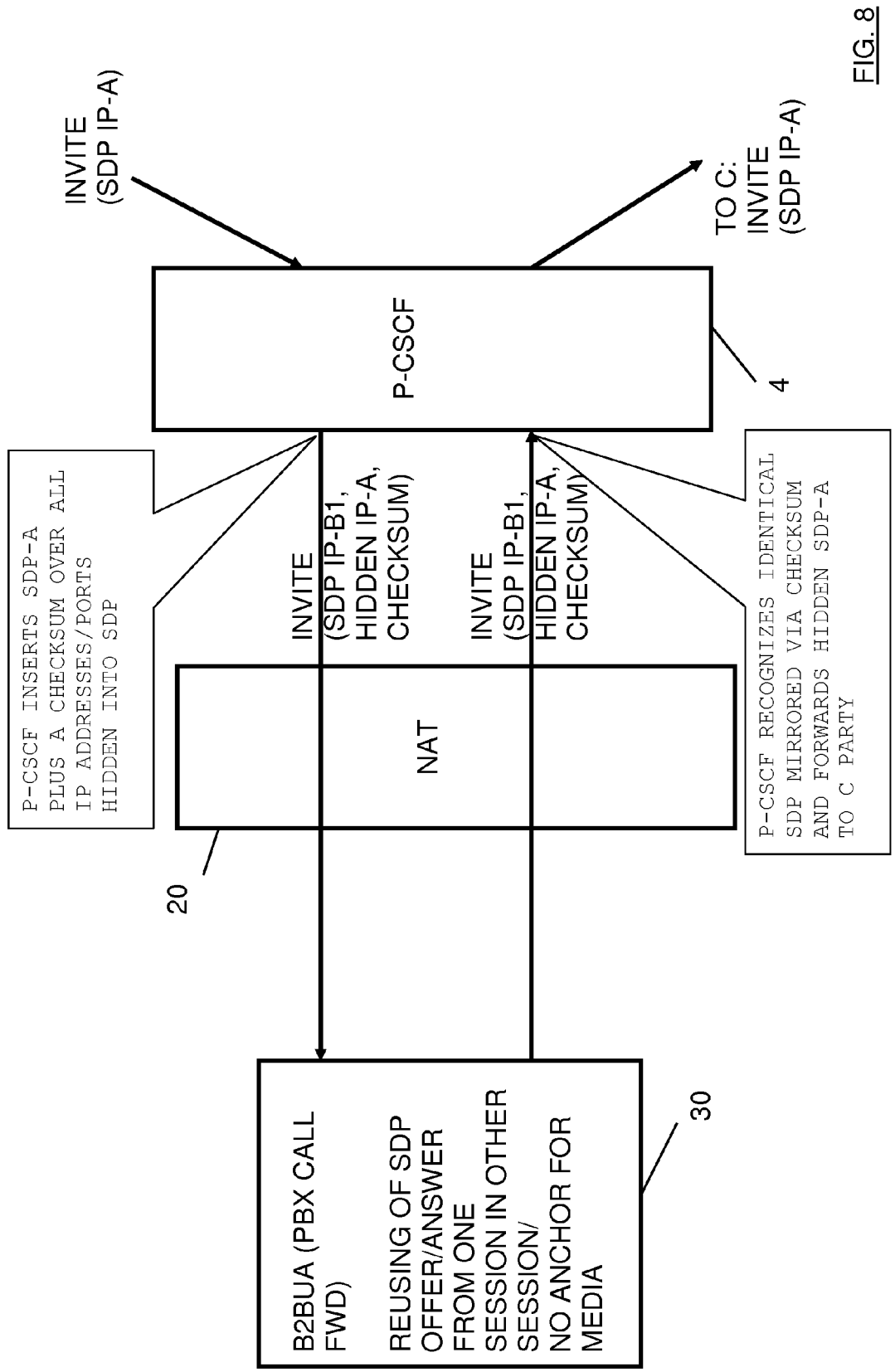
FIG. 8 shows a diagram illustrating a processing for call control at a SDP offer according to an alternative example.

With reference to FIG. 8, a handling of an SDP Offer signaling in the P-CSCF 4, the NAT router 20 and the B2BUA 30 in a network configuration corresponding to FIG. 1 is shown when a session correlation via an additional SDP signaling element is conducted.

With regard to the first session (i.e. upper arrow in FIG. 8, session outgoing to the NAT router 20), first, when an session initiation message such as a SIP INVITE message is received from a calling side, such as the UE-A 10, a normal NAT or NAPT traversal session handling is executed. That is, the P-CSCF 4 as the IMS control element or softswitch on the terminating side of a session knows that the destination is located behind the NAT or NATP router 20. Therefore, the P-CSCF 4 replaces the IP address and port information in the received SDP from the UE-A 10 with pinhole addresses and ports of the own BGF. Furthermore, the P-CSCF 4 requests or instructs the BGF 3 via the SPDF 5 (i.e. via the Gq'/H.248 interfaces) to perform a latching procedure for the NAT or NAPT traversal on a media level. In addition to this normal session handling for NAPT traversal, the P-CSCF 4 (i.e. the IMS or softswitch) writes the IP addresses and ports it received in the SDP (i.e. that of UE-A 10) into the new additional SDP information element described above. Furthermore, in order to be able on a receiving side to identify a mirrored SDP, a unique identifier, such as a checksum over all IP addresses and ports of the BGF, is added into the new additional SDP information element. Finally a session initiation message such as a SIP INVITE message is sent out from the P-CSCF 4 to the destination behind the NAT or NAPT device 20.

The B2BUA 30, which also in this alternative example may be assumed for example as being implemented in a PBX, which is located behind the NAT router 20 and conducts call processing on behalf of the called subscriber, such as call forwarding, conducts the usual processing. That is, it is the end point of the first session and establishes a second session towards the alternative destination set in the call forwarding processing, e.g. UE-C 50 in FIG. 1. Hence, it establishes a second separate session (the lower arrow in FIG. 8) via the NAT router 20, wherein it mirrors or reuses the SDP received in the first session in the connection establishment message (e.g. SIP INVITE message) sent via the second session. However, as indicated above, the B2BUA 30, due to the call forwarding function (or another similar call processing function like call transfer etc.), does not intend to be a media anchor in the connection to be established.

When, in this second session, the IMS or softswitch, e.g. again the P-CSCF 4, receives an incoming session initiation message or SIP INVITE message from a Far-end NAT terminal (i.e. a session end point located behind the NAT router 20), it first conducts a normal NAT or NAPT traversal session handling. That is, the P-CSCF 4 as the IMS or softswitch on the originating side of a NAPT traversal session replaces the IP address and port information coming from the NAT or NAPT side in the received SDP with the BGF's pinhole addresses and ports. Furthermore, the P-CSCF 4 instructs the BGF 3 via the SPDF 5 (i.e. through the Gq'/H.248 interfaces) to perform a latching procedure for the NAPT traversal on the media level. In addition to this normal NAT or NAPT traversal session handling, the P-CSCF 4 as the IMS control element or softswitch checks if in the received SDP from the NAT router 20 (i.e. from the NAPT side) the additional new information element defined above is present in the received SDP, which additional new information element comprises the IP addresses and ports of the original session initiator (i.e. UE-A 10). In case it is determined that such a new additional information element is present, the P-CSCF 4 checks further if the checksum over all IP addresses and ports matches. If this is the case, the P-CSCF 4 recognizes that the SDP received in the session initiation message coming from the NAT router 20 is a mirrored SDP. Therefore, the P-CSCF 4 replaces the SDP IP addresses and ports with the ones received in the new information element. Then the new information element is removed from SDP. Finally a session initiation message, such as a SIP INVITE message, is sent out to the destination (i.e. towards UE-C 50), wherein this SIP INVITE message comprises the replaced IP addresses and port information of the original session initiator (i.e. UE-A 10) which were part of the hidden information provided by the additional information element.

Figure 9:
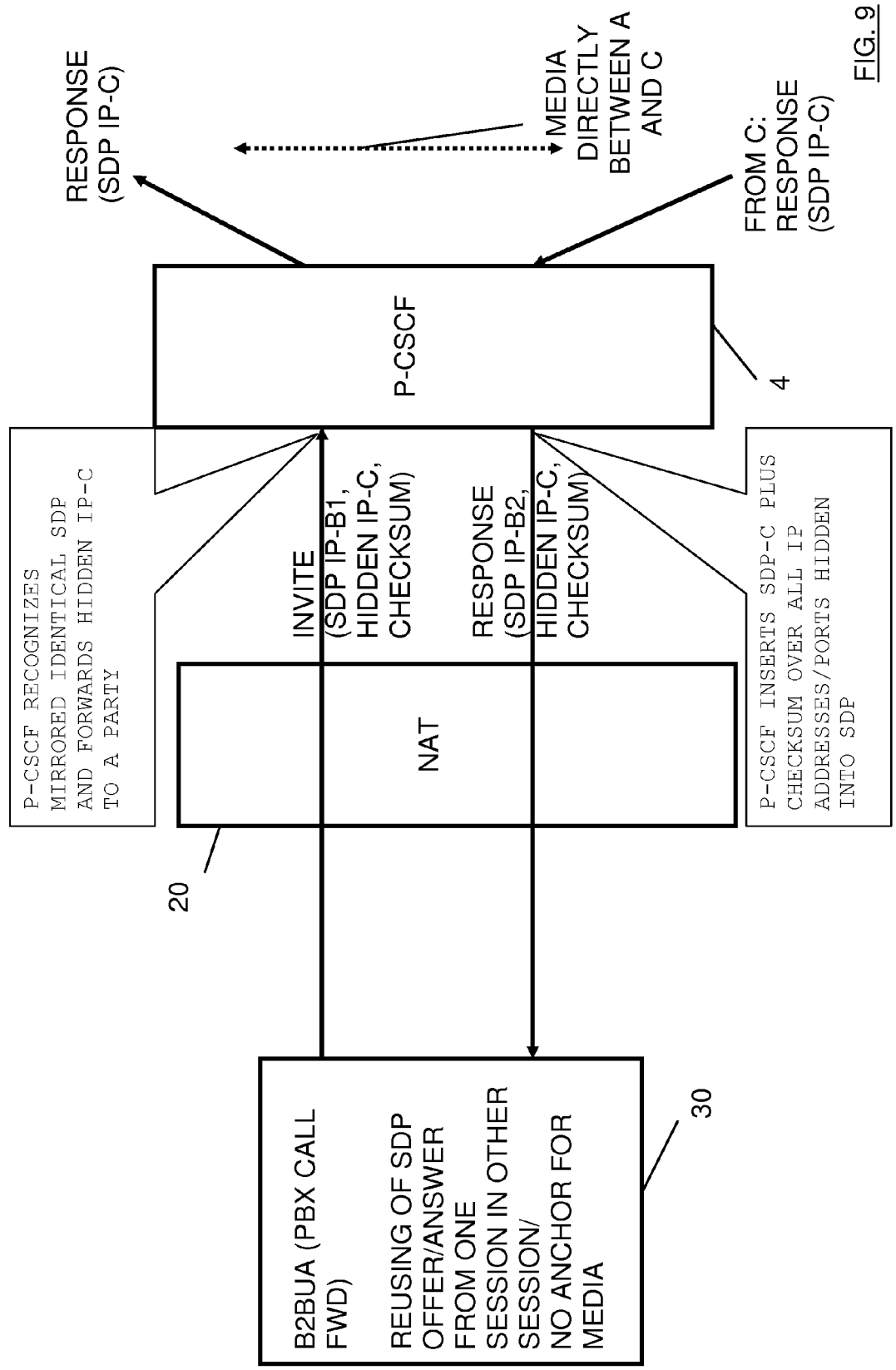
FIG. 9 shows a diagram illustrating a processing for call control at a SDP answer according to an alternative example.

Next, with reference to FIG. 9, a handling of an SDP Answer signaling, following the SDP Offer signaling of FIG. 8, in the P-CSCF 4, the NAT router 20 and the B2BUA 30 in a network configuration corresponding to FIG. 1 according to the further example of an alternative solution is described.

With regard to the second session, when the P-CSCF 4 receives a responding signaling message, such as a SIP RESPONSE message from the destination point (i.e. from UE-C 50), it conducts a normal NAT or NAPT traversal session handling. That is, the P-CSCF 4 as the IMS control element or softswitch on the originating side of a NAT or NAPT traversal session replaces the IP address and port information in the received SDP answer with the pinhole addresses and ports of the own BGF. In addition to this normal processing, the P-CSCF 4 as the IMS control element or softswitch writes or inserts a new additional information element including the received IP addresses and ports (of UE-C 50) into the SDP. Furthermore, in order to ensure a reidentification of a mirrored SDP, a checksum over all IP addresses and ports of the BGF is added to the new additional information element. Then, the SIP INVITE message including the SDP with the new additional information element comprising the hidden IP address and port information and the checksum is sent out to the B2BUA 30 behind the NAT device 20.

The B2BUA 30 which is located behind the NAT router 20 and conducts call processing on behalf of the called subscriber again conducts the usual processing. That is, as it is the end point of the first session and the second session, it reuses or mirrors the received SDP of the signaling message in the second session in the signaling via the first session through the NAT router 20 (e.g. in a corresponding SIP RESPONSE message).

When, in this first session, the IMS or softswitch, e.g. again the P-CSCF 4, receives the response message to the original INVITE message, it conducts a normal NAT or NAPT traversal session handling. That is, the P-CSCF 4 as the IMS or softswitch on the terminating side of a NAT or NAPT session replaces the IP address and port information in the received SDP with the pinhole addresses and ports of the own BGF. In addition, the P-CSCF 4 as the IMS control element or softswitch checks if in the received SDP from the NAT router (i.e. the NAPT side) the new addition information element is present in the SDP with the IP addresses and ports of the originator of the response message (i.e. the UE-C 50). If such an information element is found, the P-CSCF 4 checks in addition if the checksum over all IP addresses and ports matches. If this is the case, the P-CSCF 4 replaces in the SDP the IP addresses and ports with the ones received in the new information element (i.e. the information related to UE-C 50). Finally the new additional information element is removed from the SDP and the SIP message is sent to the originator of the first session indicating the IP addresses and port information of the UE-C 50 (received in the hidden information element included in the response message coming from the NAT router side).

As a result, the originator of the first session (i.e. UE-A 10) has the SDP data from the terminating side of the second session (i.e. UE-C 50) and the terminating side of the second session (i.e. UE-C 50) has the SDP data of the originator of the first session (i.e. UE-A 10). Therefore, as indicated by the dashed arrow in FIG. 9, a direct media path is established that bypasses the NAT router 20.

However, it is to be noted that in the procedure according to this alternative solution as shown in FIGS. 8 and 9, in contrast to the example of embodiments of the invention as described in connection with FIGS. 3 to 7, the new additional signaling element has to be generated and processed, i.e. introduced and recognized, which would require a change in the standardized processing conducted in such IMS control elements or softswitches. Furthermore, in case the BGF is used also for LI purposes, then an implementation of a procedure according to this alternative solution would disable the tapping point because the media stream bypasses also the BGF.

On the other hand, a procedure according to the alternative solution as described in connection with FIGS. 8 and 9 would be applicable in a case of a multimedia SDP that contains IP addresses of the BGF and in parallel other IP addresses from any other device. Furthermore, the alternative solution as described in connection with FIGS. 8 and 9 is also applicable in cases of distributed IMS or softswitch systems.

It is to be noted that even though the above description is related to examples where the proposed solution is applied in a TISPAN based IMS network structure, the principles described herein are also applicable in other architectures and networks, for example in 3GPP based networks where the BGF is directly connected to the P-CSCF. Furthermore, above described procedures which are described to be executed in a P-CSCF, for example, are also basically applicable in other softswitches related, for example, to VoIP, or the like.

Examples of embodiments of the present invention are also related to an apparatus comprising receiving means receiving a signaling message related to an establishment of a communication connection, the signaling message is received from a network address translation device, determining means for determining whether address information contained in a session description element of the signaling message matches with preset address information allocated to a border gateway function, and processing means for initiating, when the determining means does not determine a matching address information, a latching procedure at an own border gateway function and for setting as an address information to be used in the connection establishment an address of the network address translation device, or, for inhibiting, when the determining means determines a matching address information, a latching processing at an own border gateway function and for setting as an address information to be used in the connection establishment the address information of border gateway function received in the session description element.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), LTE, BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks and transmission nodes may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is proposed a mechanism for a connection control conducted in a communication network (such as IMS) when a back to back user agent (B2BUA) and network address translation function are involved in the establishment of the connection. When a control network element, such as a P-CSCF, receives a signaling message related to the establishment of the communication connection, via a communication leg coming from a network address translation device, it is determined whether address information contained in an SDP element of the signaling message matches with preset address information allocated to a border gateway function or BGF. When no matching is determined, normal processing like an initiation of a latching procedure at an own BGF is conducted. Otherwise, if a matching address information is determined, i.e. a mirrored SDP is deemed to be present, a latching processing at an own BGF is inhibited and the received BGF's address information are used in the connection establishment procedure. This processing is conducted at all session ends coming from the B2BUA, so that a communication connection with media flow can be established through pinholes of the BGF(s).

Although the present invention has been described herein before with reference to particular embodiments thereof, the present invention is not limited thereto and various modifications can be made thereto.

The invention claimed is:

1. An apparatus, comprising:
at least one processor; and
at least one memory including computer program code, where the at least one memory and the computer program code are configured, with the at least one processor, to cause the apparatus to at least:
receive a signaling message related to an establishment of a communication connection, wherein the signaling message is received from a network address translation device;
determine whether address information contained in a session description element of the signaling message matches with preset address information allocated to a border gateway function, wherein the address information comprises address information of the border gateway function; and based on determining that the address information of the signaling message does match the preset address information, inhibit a latching processing at another border gateway function and set in the address information to be used in the connection establishment the address information of the border gateway function received in the session description element, wherein the apparatus comprises port information of the border gateway function, and wherein the setting of the address information of the border gateway function comprises setting of the address information of the border gateway function together with the port information of the border gateway function; and send the signaling message related to the establishment of the communication connection including the address information to an end point of the communication connection.

2. The apparatus according to claim 1, wherein the at least one memory including the computer program code is configured with the at least one processor to cause the apparatus, based on determining that the address information of the signaling message does not match the preset address information, to initiate a latching procedure at the another border gateway function and set in the address information an address of the network address translation device to be used in a path of the connection establishment.

3. The apparatus according to claim 1, wherein the at least one memory including the computer program code is configured with the at least one processor to cause the apparatus to receive as the signaling message related to the establishment of the communication connection one of a signaling related to a session description protocol offer and a session description protocol answer.

4. The apparatus according to claim 1, wherein the at least one memory including the computer program code is configured with the at least one processor to cause the apparatus to:

receive a reply signaling message related to the establishment of the communication connection;

replace address information contained in a session description element of the reply signaling message with the address and port information of the own border gateway function; and send a reply signaling message related to the establishment of the communication connection including address information of the replaced address information to an end terminal of a session of the communication connection.

5. The apparatus according to claim 1, wherein the at least one memory including the computer program code is configured with the at least one processor to cause the apparatus, when conducting inhibiting of the latching processing, to one of:

prohibit sending of a latching indication towards the own border gateway function; and reset a latching indication previously sent to the own border gateway function and to send the address information of the border gateway function received in the session description element to the own border gateway function as an indication of a new partner address.

6. The apparatus according to claim 1, wherein the border gateway function whose address information is contained in the received session description element is the same as the own border gateway function or different to the own gateway function.

7. The apparatus according to claim 1, wherein the apparatus is comprised in a softswitch or network control element of a communication network, in particular in a proxy call state control function element of an Internet Protocol based network.

8. The apparatus according to claim 1, wherein the determining comprises determining that a source of the signaling message and the end point of the communication connection are both behind the network address translation device.

9. A method comprising:

receiving a signaling message related to an establishment of a communication connection, wherein the signaling message is received from a network address translation device;

determining whether address information contained in a session description element of the signaling message matches with preset address information allocated to a border gateway function, wherein the address information comprises address information of the border gateway function;

based on determining that the address information of the signaling message does match the preset address information, conducting an inhibition of a latching processing at another border gateway function and setting in the address information to be used in the connection establishment the address information of the border gateway function received in the session description element, wherein the session description element further comprises port information of the border gateway function, and wherein the setting of the address information of the border gateway function comprises setting of the address information of the border gateway function together with the port information of the border gateway function; and sending the signaling message related to the establishment of the communication connection including the address information used in the setting to an end point of the communication connection.

10. The method according to claim 9, comprising: based on determining that the address information of the signaling message does not match the preset address information, conducting an initiation of a latching procedure at the another border gateway function and setting in the address information an address of the network address translation device to be used in a path of the connection establishment.

11. The method according to claim 9, wherein one of a signaling related to a session description protocol offer and a session description protocol answer is received as the signaling message related to the establishment of the communication connection.

12. The method according to claim 9, further comprising receiving a reply signaling message related to the establishment of the communication connection;

replacing address information contained in a session description element of the reply signaling message with the address and port information of the own border gateway function; and sending a reply signaling message related to the establishment of the communication connection including address information of the replaced address information to an end terminal of a session of the communication connection.

13. The apparatus according to claim 9, further comprising, when conducting the inhibition of the latching processing, one of:
- prohibiting sending of a latching indication towards the own border gateway function, and
- resetting a latching indication previously sent to the own border gateway function and sending the address information of the border gateway function received in the session description element to the own border gateway function as an indication of a new partner address.

14. The method according to claim 9, wherein the border gateway function whose address information is contained in the received session description element is the same as the own border gateway function or different to the own gateway function.

15. The method according to claim 9, wherein the method is executed in a softswitch or network control element of a communication network, in particular in a proxy call state control function element of an Internet Protocol based network.

16. A computer program product for a computer comprising a non-transitory computer-readable medium storing software code portions executed by a processor to perform the method of claim 9.

17. The computer program product according to claim 16, wherein said computer program product is directly loadable into the computer readable medium of the computer by at least one of upload, download and push procedures.

\* \* \* \* \*